United States Patent [19]

Moehwald

[11] Patent Number: 4,636,430

[45] Date of Patent: Jan. 13, 1987

[54] COMPOSITE MATERIAL CONSISTING OF POROUS MATERIALS AND ELECTRICALLY CONDUCTIVE POLYMERS

[75] Inventor: Helmut Moehwald, Heidelberg, Fed. Rep. of Germany

[73] Assignee: BASF Aktiengesellschaft, Fed. Rep. of Germany

[21] Appl. No.: 838,783

[22] Filed: Mar. 12, 1986

[30] Foreign Application Priority Data

Mar. 20, 1985 [DE] Fed. Rep. of Germany ....... 3510036

[51] Int. Cl.$^4$ .............................................. C25B 3/02
[52] U.S. Cl. ................................. 428/304.4; 204/58.5; 204/78; 204/180.9; 428/311.1; 428/311.5; 428/311.7
[58] Field of Search ...................... 204/58.5, 78, 180.9; 428/304.4, 311.1, 311.5, 311.7

[56] References Cited

U.S. PATENT DOCUMENTS 4,547,270  10/1985  Naarmann .......................... 204/58.5

FOREIGN PATENT DOCUMENTS 133939  7/1984  European Pat. Off. .

OTHER PUBLICATIONS

K. C. Khulke and R. S. Mann, J. Polym. Sci. 20 (1982), 1089–1095.

Primary Examiner—William J. Van Balen
Attorney, Agent, or Firm—Keil & Weinkauf

[57] ABSTRACT

In a composite material consisting of a porous material and electrically conductive polymers, the surface of the pores of the porous material is first coated with a layer of an electrically conductive polymer obtained by treating the monomers with an oxidizing agent, and a layer of an electrically conductive polymer obtained by anodic oxidation of the monomers is applied on top of this.

5 Claims, No Drawings

COMPOSITE MATERIAL CONSISTING OF POROUS MATERIALS AND ELECTRICALLY CONDUCTIVE POLYMERS

The present invention relates to a composite material which consists of a porous material and electrically conductive polymers and in which the surfaces of the pores of the porous material are coated with layers of electrically conductive polymers.

According to K. C. Khulke and R. S. Mann, J. Polym. Sci. 20 (1982), 1089–1095, pyrrole can be polymerized in aqueous solution in the presence of potassium persulfate so that the polymer separates out in the form of a finely divided black powder.

The earlier Patent Application P 33 27 012 (EP-A-84 108 455) discloses a process for the electrochemical polymerization of pyrrole, in which pyrrole is polymerized onto a sheet-like anode by anodic oxidation in the presence of a conductive salt and in an electrolyte solvent, the sheet-like elements used being materials which have a large surface area, such as woven fabrics, knitted fabrics, plaited fabrics or nets, or porous materials, such as polyurethane foams and foams of other thermoplastics having open cells.

It is an object of the present invention to provide composite materials consisting of porous materials and electrically conductive polymers and having better properties than the conventional materials, and an advantageous process for the preparation of such composite materials.

We have found that this object is achieved by composite materials consisting of porous materials and electrically conductive polymers, wherein the surfaces of the pores are first coated with a layer of an electrically conductive polymer obtained by treating the monomers with an oxidizing agent, and a layer of an electrically conductive polymer obtained by anodic oxidation of the monomers is applied on top of this.

The present invention furthermore relates to a process for the preparation of such composite materials consisting of porous materials and electrically conductive polymers. Other subjects of the invention are mentioned in the detailed description below.

We have found that the composite materials consisting of the porous materials according to the invention have the same mechanical properties, for example the same porosity, as the starting materials, and moreover are electrically conductive. In experiments to date to prepare electrically conductive porous materials, electrically conductive, finely divided substances have been incorporated in the material. This resulted in a change in the properties of the material. This is not the case with the materials of the invention. Only in this way is it possible, for example, for the novel composite materials to be used as electrodes, for example as electrodes in electrolysis for waste water treatment, as catalyst electrodes or as electrodes for primary and secondary batteries. The composite materials according to the invention can also be used as ion exchange material, as electrostatic precipitators and as antistatic material for packaging. Furthermore, housings, shoe soles and carpets may consist of the novel composite materials, which have advantageous antistatic properties. The materials may also be used for shielding from electromagnetic pulses and as electrostatic precipitators for precipitating dust from gaseous substances.

The novel composite materials can be prepared using any porous substances whose cavities in the workpiece are filled with air and which have open pores and cells which are connected to the surrounding air. Examples of suitable porous materials are poromeric materials, such as random webs of nylons or polyesters, porous inorganic materials, such as porous glass, and in particular porous plastics, such as foamed plastics having open cells. Polyurethane (PUR) foams which have open cells and a porosity greater than 80% are particularly advantageous. Information about polyurethane foams is given in, for example, Römmp's Chemie-Lexikon, 7th edition, Franksche Verlagshandlung W. Keller and Co., Stuttgart (1975), volume 5, page 2774.

The materials may be in the form of films, sheets, fibers or any other three-dimensional structures; advantageously, the porous material is converted to the shape in which it is subsequently used.

To prepare the composite materials, a layer of an electrically conductive polymer obtained by treating the polymer-forming monomers with an oxidizing agent in the presence of a conductive salt is first applied onto the surface of the pores of the porous material. Examples of monomers capable of being polymerized by oxidizing agents are compounds from the class consisting of the 5-membered heterocyclic compounds which possess a conjugated $\pi$-electron system and contain nitrogen, sulfur or oxygen as heteroatoms. Examples of these compounds are those from the class consisting of the pyrroles, the thiophenes or the furans. Among the pyrroles, examples of suitable compounds are unsubstituted pyrrole itself and N-substituted pyrroles such as N-alkylpyrroles. However, other substituted pyrroles, such as 3,4-dialkylpyrroles or 3,4-dichloropyrroles, may also be used. Among the compounds of the class consisting of the thiophenes, particularly suitable compounds are unsubstituted thiophene itself as well as 2- or 3-alkylthiophenes, eg. 3-methylthiophene or 2,3-diethylthiophene. Among the compounds of the class consisting of the furans, unsubstituted furan itself is likewise suitable, as well as alkylfurans, such as 2-ethyl- or 2,3-dimethylfuran. The stated 5-membered heterocyclic compounds may also be polymerized together with other copolymerizable compounds, eg. thiazole, oxazole or imidazole. It is also possible to polymerize compounds such as aniline or benzidine, using chemical oxidizing agents.

Advantageously used oxidizing agents are oxygen-containing oxidizing agents, which may be used in amounts of from 0.2 to 10 moles per mole of the compound being polymerized. Larger amounts of oxidizing agent are not required since the stated amount is sufficient to convert the total amount of starting material to the polymer. The polymerization of the monomers by means of an oxygen-containing oxidizing agent is advantageously carried out in solution, water, if appropriate mixed with an organic, water-miscible solvent, having proven useful as a solvent. However, it is also possible to use organic solvents, such as dimethyl sulfoxide, methanol, acetonitrile, ethylene carbonate, propylene carbonate, dioxane or tetrahydrofuran. Advantageously, the solutions employed contain from 0.1 to 50, preferably from 1 to 5, % by weight of the monomer being polymerized. The amount of oxidizing agent to be added is governed by the abovementioned principle. The oxidation can advantageously be carried out at from $-20°$ to $40°$ C. The polymerization of these monomers is effected in the presence of a conductive salt, which is also referred to as a complexing agent or dopant. Examples of conductive salts which have proven useful are $KHSO_4$, $Na_2SO_4$, $KCOOH$, $LiClO_4$, $KClO_4$, $NEt_4ClO_4$, $NBu_4ClO_4$, $KAlF_3$, $NaAlF_6$, $KBF_4$, $K_2ZrF_6$, $K_2NiF_4$, $HBF_4$, $HO_2(NO_3)_2$, $K_2SO_4$, $FeCl_3$, $NOPF_6$, $KAsF_6$ or $NaPF_6$. The concentration of the conductive salt is such that not less than 1 mole of the above conductive salts are used per 3 moles of the monomer or monomer mixture employed.

To apply the layer of the polymer onto the surface of the porous material serving as the matrix, the following procedure is advantageously adopted: first a solution of the monomer and of the conductive salt is applied onto the surface, and then the material is treated with a solution of the oxygen-containing oxidizing agent.

Oxygen-containing oxidizing agents which have proven particularly useful are peroxo acids and their salts, eg. peroxodisulfuric acid and its alkali metal and ammonium salts. Peroxoborates or peroxochromates, such as sodium perborate or potassium dichromate, are also preferably used. Permanganates, such as potassium permanganate, are also suitable if small amounts of acid are added to this permanganate. Hydrogen peroxide is also preferably used, but in this case the presence of a conductive salt is essential. Other oxidizing agents which can be used without a conductive salt are nitrosyl and nitryl salts of the general composition $NO^+X^-$ and $NO_2^+X^-$, where $X^-$ is $Cl^-$, $NO_3^-$, $BF_4^-$, $SbCl_6^-$ or $HSO_4^-$.

The amount of monomers which form the conductive polymer are chosen so that about 0.01 to 10% by weight, based on the weight of the porous material, of a layer of the conductive polymer are formed. The porous material coated in this manner with a layer of electrically conductive polymer is then immersed in a solution which contains an anodically oxidizable monomer and a conductive salt, the coated porous material being made the anode and the monomer being anodically polymerized so that the polymer layer grows on top of the layer of conductive polymer already present. The anodically oxidizable monomers may be the same as those stated above. Suitable compounds are therefore those from the class consisting of the pyrroles, the thiophenes or the furans. However, aniline, substituted anilines, diphenylamine or triphenylamine may also be applied by anodic polymerization.

The concentration of the monomer in the solvent is in general about 0.1 mole per liter of solvent, but may be lower or higher and may vary within wide limits. Advantageously, a concentration of from 0.01 to 1 mole of monomer per liter of solvent is employed. The amount of monomer is chosen so that from 0.1 to 100% by weight, based on the weight of the porous material, of the second layer is formed.

Suitable electrolyte solvents are the above solvents. The polar organic solvents which are conventionally used for the anodic oxidation of the abovementioned heterocyclic compounds and are capable of dissolving the monomers and the conductive salt are particularly useful. In the case of the five-membered heterocycles, the solvent itself should be very highly aprotic. Alcohols, ethers, such as 1,2-dimethoxyethane, dioxane or tetrahydrofuran, acetone, acetonitrile, dimethylformamide and propylene carbonate are preferred. In the case of aniline, the procedure can be carried out in an acid-containing ($pH \leq 3$) aqueous or water/methanol electrolyte.

The conductive salts used can be the conventional anionic or ionizable compounds usually also employed for such anodic oxidations of the heterocyclic compounds or of the other stated monomers, for example the above conductive salts which may be present during the oxidation of the monomers with oxygen-containing oxidizing agents. Anions of aromatics possessing acidic groups, for example substituted aromatic sulfonic acids and polysulfonic acids, are also useful. Conductive salts which contain benzenesulfonate or toluylsulfonate anions are particularly preferred. In the process, the concentration of the conductive salt is in general from 0.001 to 1, preferably from 0.01 to 0.1, mole/l of solvent.

The process can be carried out in an electrolysis cell or electrolysis apparatus having an external direct current source. The porous material coated with the conductive polymer is made the anode.

The cathode can consist of, for example, another metal such as platinum, molybdenum, tungsten, stainless steel, nickel or titanium, or of a carbon material, such as graphite, glassy carbon, carbon fibers, etc.

The reaction temperature at which the process is carried out has proven not to be critical and can therefore be varied within a wide range, provided that it does not fall below the solidification temperature or exceed the boiling point of the electrolyte solvent. In general, a temperature of from $-20°$ to $+40°$ C. has proven to be an advantageous reaction temperature, the procedure usually being carried out at room temperature (from 22° to 24° C). Otherwise, the conventional electrolysis conditions employed for such processes can be maintained. The voltage at which the electrochemical polymerization is carried out is advantageously from 0 to 3.0, preferably from 0.5 to 1.5, volt, measured against a saturated calomel reference electrode. An advantageous current density has proven to be from 0.1 to 100, preferably from 1 to 10, $mA/cm^2$. In general, it is desirable for the thickness of the applied layer of conductive polymer to be from 0.1 to 100 $\mu$m. The layer thickness depends on the time for which electrolysis is carried out. The resulting coated porous composite materials are then washed with a solvent to remove adhering solvent and are dried. In the composite materials prepared according to the invention, the conductive polymer is present in the form of a complex cation of the polymer with the counter-anion of the conductive salt. Electrical conductivity of the composite materials is in general from $10^{-2}$ to $10^2$ S/cm. The composite materials have the abovementioned applications.

The Examples which follow illustrate the invention. Parts and percentages are by weight.

EXAMPLE 1

A cube which has an edge length of 1 cm and consists of polyurethane foam which has a density of about 30 $kg/m^3$ and in which about 90% of the cells are open-pored is first impregnated with 10 drops of a solution of 7.14 g of benzenesulfonic acid, 5 g of pyrrole and 100 g of methanol. The completely wet polyurethane cube is then impregnated with 10 drops of a solution of 5 g of $Na_2S_2O_8$ in 100 g of a 1:1 mixture of methanol and water. After about 5 minutes, polymerization of the pyrrole is complete. The cells and the outer surface of the cube are found to be coated with a polypyrrole film. The resulting composite material is washed first with a 1:1 mixture of water and methanol and then with pure methanol and is dried under reduced pressure (about 1 mbar) for 2 hours. The porous composite material thus obtained is electrically conductive over the entire volume (resistance across the diagonals: about 400 KΩ).

The cube of composite material thus obtained is treated in an ultrasonic bath containing methanol/$H_2O$ or methanol for 15 minutes. Only a small part of the polypyrrole adhering externally becomes detached. After the cube has dried, the resistance across the diagonals is measured as 500 KΩ. No substantial change in the elastic properties was observed.

Repeated quenching of the resulting composite material in liquid nitrogen also did not result in a loss of the bonding properties or the electrical properties of the composite material.

The composite material thus obtained is then introduced, as the anode, into an electrolyte which contains 0.5 mole of $LiBF_4$ dissolved in 1 l of propylene carbonate. 2% by volume of pyrrole is introduced into the solution. Pt, Ni or another metal or graphite or carbon fiber composites are used as the cathode.

Anodic oxidation is carried out using a current density of 1 mA/$cm^2$. After about 1 hour, the current is switched off and the anode is washed monomer-free with propylene carbonate as the solvent and is dried.

The surface of the cells is found to be coated with a further 1000%, based on the weight of the composite material, of polypyrrole.

EXAMPLE 2

The cube obtained as described in Example 1 is introduced into a button cell which contains an electrolyte consisting of polypropylene carbonate and $LiBF_4$. A polypropylene web is placed on top of the cube of composite material, and a lithium foil is placed on top of the web. The foil is made the anode, and the composite material is made the cathode for the discharge process; during the charging process, the poles are interchanged. A cell possessing this structure could be recharged electrochemically and cycled with virtually 100% current efficiency.

EXAMPLE 3

A cube of polyurethane foam is impregnated with a solution of pyrrole and benzenesulfonic acid in methanol, as described in Example 1. The foam is then treated with air for 1 hour. The oxygen in the air initiates polymerization, which is complete after about 1 hour. The resulting composite material is then introduced into a cell having a pyrrole-containing electrolyte, and the foam is made the anode. Again, polypyrrole can be deposited on the composite material by electrochemical polymerization.

EXAMPLE 4

A composite material prepared as described in Example 1 or 3 is made the anode in an electrolyte which contains 0.5 mole of $LiClO_4$ dissolved in 1 l of propylene carbonate. 20% by volume of thiophene are introduced into this electrolyte, after which anodic polymerization is carried out with a current density of 2 mA/$cm^2$.

EXAMPLE 5

A PUR cube having an edge length of 1 m is tumbled thoroughly in a solution of 10% by volume of aniline in about 4 M $HClO_4$ until complete wetting has occurred. This cube is then wet again with a solution of 5 g of $Na_2S_2O_8$ in 20 ml of $H_2O$ and tumbled thoroughly. After about 3 minutes, the PUR is found to be completely coated with green polyaniline. The cube is then washed with $H_2O$ until polyaniline is no longer washed out. After 3 minutes in an ultrasonic bath (about 1:1 methanol/$H_2O$ solution), the PUR/polyaniline composite material is washed with methanol and dried in the air, or in an oven under reduced pressure. Pyrrole is then applied by electrochemical polymerization, as described in Example 1.

A cube of this type increases by only 10% in weight, and the resistance measured across the diagonals is about 15 MΩ, which falls to about 5 MΩ on compression to half the size.

EXAMPLE 6

Instead of a PUR foam, it is also possible for a compact PUR sole having a density of about 1000 kg/$m^2$ to be converted to a conductive composite material with polypyrrole or polyaniline, as described in Example 1 or 5. It is surprising that the sole not only possesses surface conductivity but, as a result of this procedure, also possesses volume conductivity (about 15 MΩ over a distance of 1 cm), the mass having increased by only about 1.5–2%.

I claim:

1. A composite material consisting of a porous material and electrically conductive polymers, wherein the surfaces of the pores are first coated with a layer of an electrically conductive polymer obtained by treating the monomers with an oxidizing agent, and a layer of an electrically conductive polymer obtained by anodic oxidation of the monomers is applied on top of this.

2. A process for the preparation of a composite material consisting of a porous material and electrically conductive polymers, wherein a layer of a monomer, which is capable of forming an electrically conductive polymer, and an oxygen-containing oxidizing agent are applied onto the surface of the pores of the porous material, the monomer is polymerized, the porous material treated in this manner is immersed in a solution which contains an anodically oxidizable monomer and a conductive salt, the porous material is made the anode, and the monomer is anodically polymerized.

3. A process as claimed in claim 2, wherein a compound from the class consisting of the pyrroles or of the thiophenes or of the anilines is treated with an oxidizing agent.

4. A process as claimed in claim 2, wherein a compound from the class consisting of the pyrroles or of the thiophenes or of the anilines is subjected to anodic oxidation.

5. A process as claimed in claim 2, wherein an open-cell polyurethane foam is used as the porous material.

* * * * *